US011222374B1

(12) United States Patent
Bell et al.

(10) Patent No.: US 11,222,374 B1
(45) Date of Patent: Jan. 11, 2022

(54) PROVIDING REPLACEMENT ITEMS FOR DISCONTINUED ITEMS

(71) Applicant: Amazon Technologies, Inc., Seattle, WA (US)

(72) Inventors: Adrian Bell, Seattle, WA (US); Andre Wyatt, Seattle, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 83 days.

(21) Appl. No.: 16/558,570

(22) Filed: Sep. 3, 2019

(51) Int. Cl.
G06Q 30/06 (2012.01)

(52) U.S. Cl.
CPC ..... *G06Q 30/0629* (2013.01); *G06Q 30/0603* (2013.01); *G06Q 30/0631* (2013.01); *G06Q 30/0635* (2013.01); *G06Q 30/0641* (2013.01)

(58) Field of Classification Search
CPC . G06Q 30/0601–0643; G06Q 30/0629; G06Q 30/0631; G06Q 30/0635; G06Q 30/0641; G06Q 30/0603; G06Q 10/087
See application file for complete search history.

(56) References Cited

U.S. PATENT DOCUMENTS

| | | | | |
|---|---|---|---|---|
| 10,726,469 | B1 * | 7/2020 | Otwell | G06Q 30/0641 |
| 10,762,511 | B1 * | 9/2020 | Pope | G06Q 30/014 |
| 2013/0073582 | A1 * | 3/2013 | Krishnamoorthy | G06F 16/9535 707/769 |
| 2013/0191241 | A1 * | 7/2013 | Fillipi | G06Q 30/02 705/26.7 |
| 2017/0046773 | A1 * | 2/2017 | Hendricks, II | G06Q 30/0635 |
| 2017/0220986 | A1 * | 8/2017 | Putcha | G06Q 20/102 |
| 2018/0232795 | A1 * | 8/2018 | Goulart | G06Q 30/0255 |
| 2020/0273083 | A1 * | 8/2020 | Motwani | G06Q 30/0627 |

OTHER PUBLICATIONS

The Value of Purchase History Data in Target Marketing. Peter Rossi. Robert McCullough. Greg Allenby. Nov. 4, 1996. (Year: 1996).*

* cited by examiner

*Primary Examiner* — William J Allen
(74) *Attorney, Agent, or Firm* — Thomas | Horstemeyer, LLP

(57) ABSTRACT

Disclosed are various embodiments for providing a continued item purchase experience for users wishing to repeat purchases of items when previously purchased items have been discontinued or are no longer available. A replacement item is identified for an item that is determined to be discontinued. The interaction history of the discontinued item is associated with the replacement item. A user interface is generated to include a listing of previously purchased items, including the replacement items that are arranged in a particular order. The replacement item is arranged in the user interface according to the interaction history of the discontinued item.

20 Claims, 13 Drawing Sheets

PROVIDING REPLACEMENT ITEMS FOR DISCONTINUED ITEMS

BACKGROUND

An electronic commerce system may include listings of items offered for sale, lease, download, rent, etc., by many different merchants. Users may use the electronic commerce system to purchase, lease, download, rent, etc., items of interest. In some instances, users may wish to repeat behavior with respect to particular items of interest. However, over time the particular items of interest may be discontinued or otherwise no longer available on the electronic commerce system.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to providing an item repurchase experience for users wishing to repeat purchases of items when the previously purchased items have been discontinued or are no longer available. In particular, when a user requests to view a list of previously purchased items and a previously purchased item has been discontinued, a replacement item that is similar to the discontinued item can be identified from an item catalog and presented to the user in place of the discontinued item. Further, a purchase history associated with the replacement item can be associated with the purchase history of the discontinued item such that when the listing of items are presented according to a frequency of purchase, a recency of purchase, a cadence of purchase (e.g., purchased item every three months) and/or a recommendation, the replacement item is displayed in a location of the user interface that would otherwise be associated with the discontinued item.

According to various embodiments of the present disclosure, a user can request to view a listing of previously purchased items available for sale, lease, download, rent, etc. by different merchants through an electronic commerce system. Providing a user a listing of previously purchased items in a single interface allows the user the opportunity to easily select items that the user may wish to repurchase without having to search through the item catalog to rediscover items of interest. For example, assume that the electronic commerce system includes grocery store items. A user may typically purchase specific types of items such as bread (e.g., wheat), milk (e.g., 2% organic white), fruit (e.g., green apples), and eggs (e.g., organic brown eggs) on a weekly basis. When the user requests to view a listing of previously purchased items, the user can be presented with a user interface that includes previously purchased items that facilitates the repurchase of items by the user through interactions with a single interface.

Figure 1:
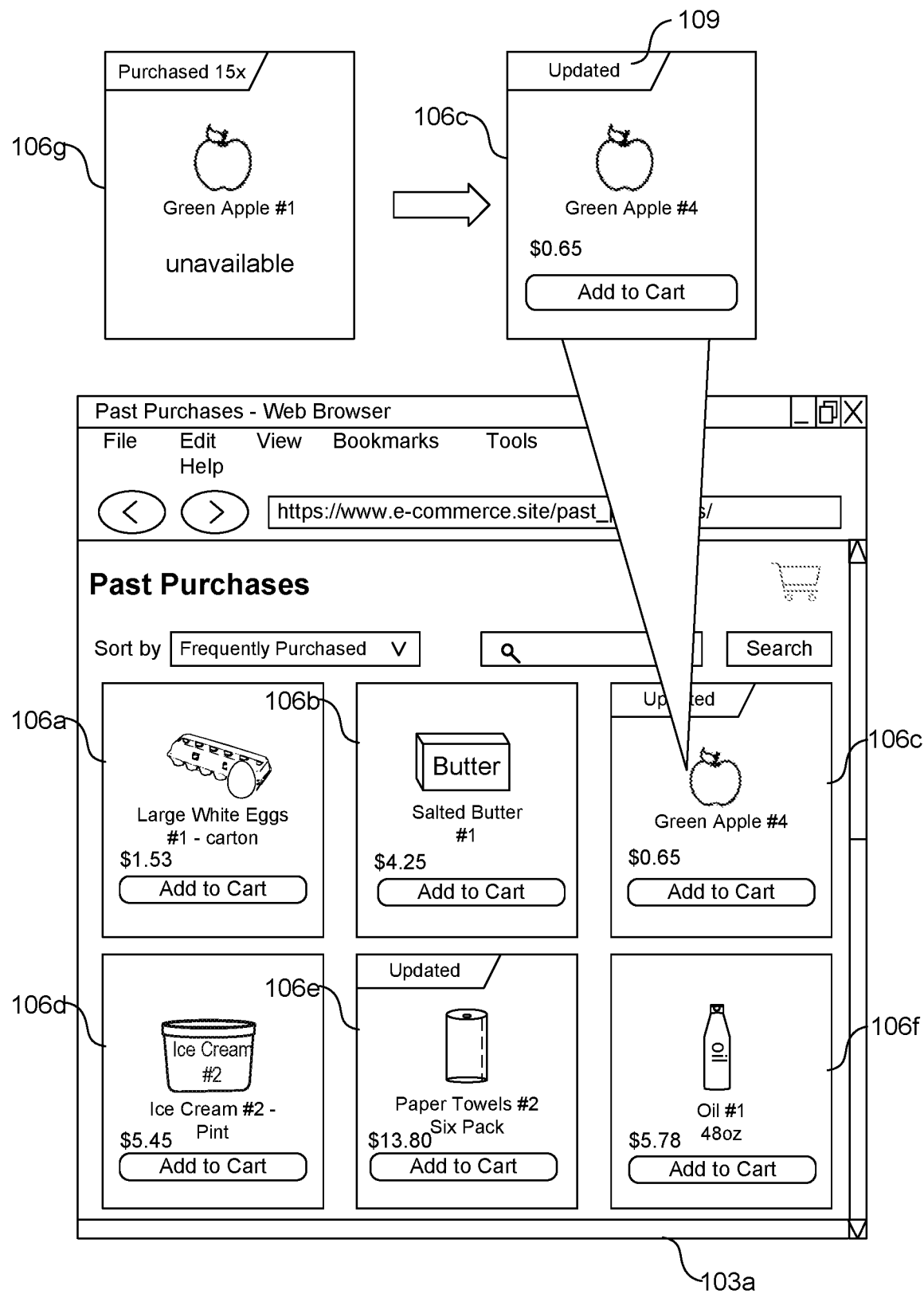
FIG. 1 is a drawing of an example user interface illustrating how a replacement item can replace a discontinued item according to various embodiments of the present disclosure.

FIG. 1 illustrates an example of a user interface 103, denoted herein as user interface 103a, that includes multiple item listings 106 (e.g., 106a, 106b, 106c, 106d, 106e, 106f) of items that have been previously purchased by the user in accordance with various embodiments of the present disclosure. According to various embodiments, the item listings 106 associated with the different items can be arranged in the user interface 103a according to frequency of purchase, recency of purchase, a cadence of purchase, recommendations, and/or other factors as can be appreciated. The item listings 106 of FIG. 1 are displayed according to a frequency of purchase.

In the example of FIG. 1, assume that the user has typically purchased "Green Apple #1" associated with item listing 106g, which indicates that the item is no longer available. Although "Green Apple #1" is no longer available for purchase through the electronic commerce system, "Green Apple #4" associated with item listing 106c can be identified as being similarly related to "Green Apple #1" such that item "Green Apple #4" can be offered as a replacement of "Green Apple #1". For example, while both items may be assigned different item identifiers, the items may still be included in the same category in an item catalog taxonomy, correspond to green apples, and have similar attributes (e.g., size, firmness, freshness, etc.).

As such, the user interface 103a of FIG. 1 includes the item listing 106c that is associated with "Green Apple #4" instead of the item listing 106g that is associated with unavailable item. Further, while the user may not have previously purchased "Green Apple #4," the purchase history associated with "Green Apple #1" can be modified to include or otherwise associated with the purchase history of "Green Apple #4" for future purchase of "Green Apple #4". Accordingly, the placement of the item listing 106c corresponds to the location in the user interface 103a where the item listing 106g would have been placed had the item been available. To this end, the replacement item does not lose priority because it is a different item (e.g., associated with a different item identifier).

According to various embodiments, the item listing 106c associated with the replacement item may include a notification 109 that indicates to the user that the item has been updated. For example, the notification 109 in FIG. 1 for item listing 106c includes a badge element that states "Updated." In other examples, the notification 109 may include a symbol or other type of element that notifies the user that something is different about the particular item listing 106.

As will be discussed with reference to FIGS. 3A-4D, the user interface 103 may include a user interface component associated with the replacement item that in response to a user interaction (e.g., hover action, component selection, etc.), causes a user interface view to be modified to include additional information regarding the replacement item. For example, the user interface view can be modified to include a user interface element that includes an explanation that the replacement item has replaced the discontinued item. According to various embodiments, the user interface element can comprise an overlay interface, a pop-up component, a card component or other type of inline expansion component, and/or other type of user interface element as can be appreciated.

As one skilled in the art will appreciate in light of this disclosure, certain embodiments may be capable of achieving certain advantages, including some or all of the following: (1) reducing computer resource utilization (e.g., memory consumption, processor utilization, network transfer, etc.) by avoiding the need to individually search for an online catalog for items when an item of interest is no longer available through an electronic commerce system; (2) improving the user experience in interacting with a computer system by automatically identifying replacement items so the user in no longer required to search for a replacement item when an item of interest is no longer available; (3) improving the functioning of the computing system through a more streamlined repurchase process that reduces user frustration when item of interests are no longer available; and so forth. In the following discussion, a general description of the system and its components is provided, followed by a discussion of the operation of the same.

Figure 2:
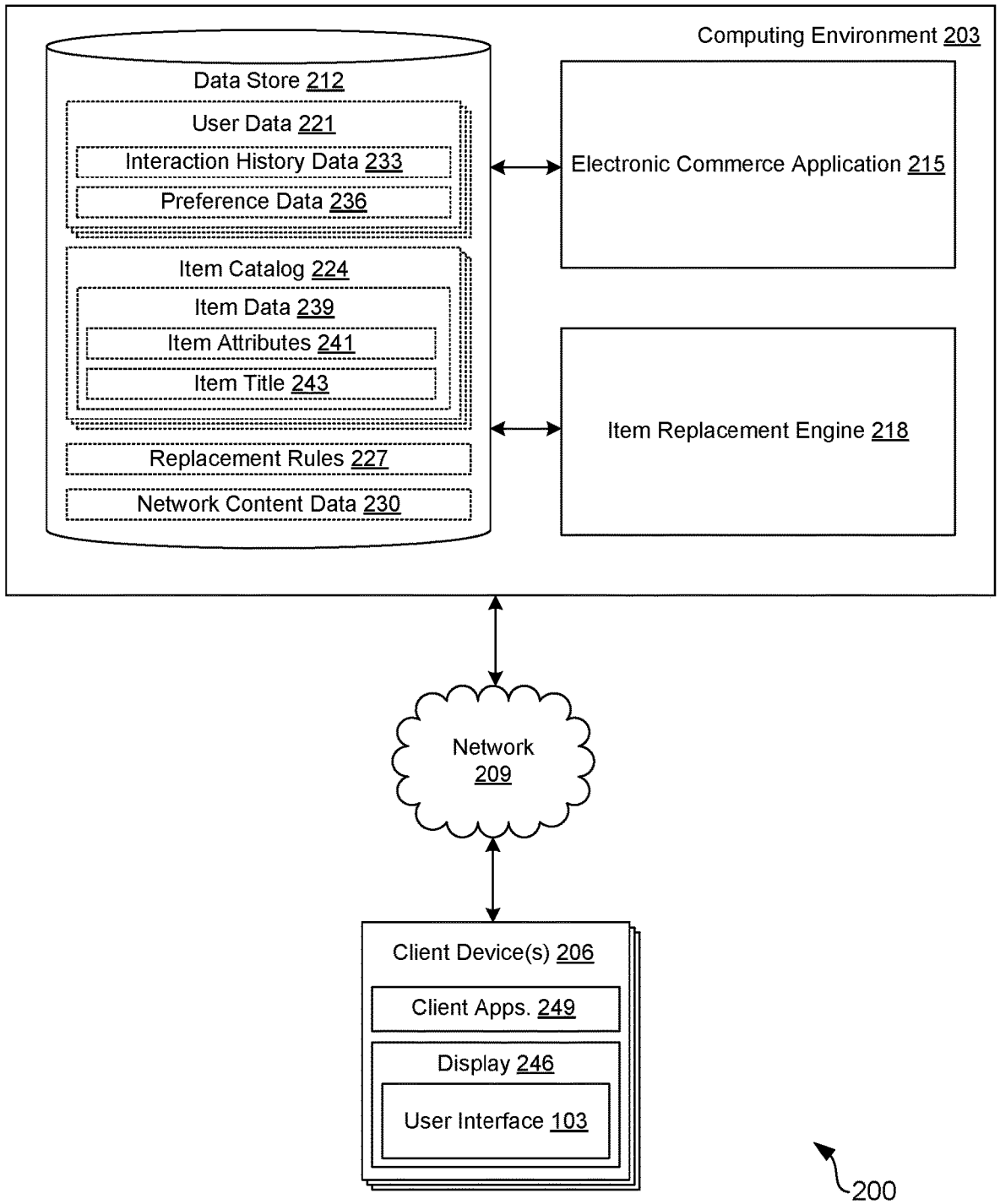
FIG. 2 is a schematic block diagram of a networked environment according to various embodiments of the present disclosure.

With reference to FIG. 2, shown is a networked environment 200 according to various embodiments. The networked environment 200 includes a computing environment 203 and one or more client device(s) 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include an electronic commerce application 215, an item replacement engine 218, and other applications, services, processes, systems, engines, or functionality not discussed in detail herein.

The electronic commerce application 215 is executed in order to facilitate the online sale, download, lease, rent, etc. of items from one or more electronic commerce systems over the network 209. Such items may include products, goods, services, digital content, and/or other items. The electronic commerce application 215 also performs various backend functions associated with the online presence of an electronic commerce system in order to facilitate the online purchase of items. For example, the electronic commerce application 215 generates network pages such as, for example, web pages and/or other types of network content that are provided to client devices 206 for the purposes of promoting and selecting items for purchase, rental, download, lease, or any other forms of consumption.

The item replacement engine 218 is executed to identify replacement items for discontinued or otherwise unavailable items when generating a listing of previously purchased items offered for sale, lease, rent, download, etc., via one or more electronic commerce systems. To this end, the item replacement engine 218 may identify items within the item catalog 224 that can be considered similar to the discontinued or otherwise unavailable item. In some embodiments, the item replacement engine 218 may evaluate one or more factors associated with the user, the discontinued item, and items in the same category to identify a replacement item. The factors may include for example, item data (e.g., attributes, item title, price, etc.), interaction history data 233, preference data 236, and/or other factors. For example, item attributes 241, item titles 243, and other factors associated with items in the same category as the discontinued item can be compared with the discontinued item to determine a similarity. Further, interaction history data 233 can be used to determine if the user has had a negative or positive interaction (e.g., reject a recommendation, purchase an item, etc.) with any given item.

In some embodiments, the item replacement engine 218 may assign a weight to each of the factors and generate a score for each item based in part on one or more factors. To this end, the item replacement engine 218 may rank the similar items based at least in part on the score and select a replacement item according to the ranking. In some embodiments, the replacement item can be selected based on preferences associated with the user.

The data stored in the data store 212 includes, for example, user data 221, an item catalog 224, replacement rules 227, network content data 230, and potentially other data. The user data 221 includes various data collected from or generated by users and/or customers having accounts in an electronic commerce site facilitated by the electronic commerce application 215. The user data 221 may include interaction history data 233, preference data 236, account address(es), payment instrument data, authentication information, and/or other data associated with a user or user account of the electronic commerce site.

The interaction history 233 may include information specific to a user such as, for example, a purchase history (including purchase frequency, purchase cadence, purchase recency, etc.), a browsing history, a viewing history, a rating history, and/or other information that reflects a prior interaction of the user with the computing environment 203. The preference data 236 may include information related to preferences of items, item attributes, brands of items, quality of items, quantity of items, and/or other information.

The item catalog 224 includes item data 239 regarding items offered through the electronic commerce application 215. Such items may include products, goods, services, digital content, and/or other items that can be offered for sale, lease, rent, download, etc. The items in the item catalog 224 may be organized according to a taxonomy of categories. For example, the items in the item catalog 224 can be categorized according to an item type with various item attributes 241 further defining a placement of an item in the taxonomy. For example, duck eggs and chicken eggs can include two branches of the taxonomy under a category for "eggs." Further, the category associated with chicken eggs, for example, may further include branches according to size, color, whether they are organic, and so on.

The item data 239 may include item attributes 241, item title(s) 243, an item identifier, descriptions, weights, prices, quantities available, export restrictions, customer reviews, customer ratings, images, videos, version information, availability information, shipping information, and/or other data. Item attributes 241 can include specific characteristics that define a given item. For example, item attributes 241 can include size, color, weight, packaging, quantity, freshness, ripeness, nutritional values, how the item is processed, brand, and/or other attributes as can be appreciated. The item title 243 can include a title associated with the item that can be used to further define item attributes 241 and determine placement in the item catalog 224 for the item. According to various embodiments, a replacement item for a discontinued item can be identified based at least in part on the item title 243, the item attributes 241, and/or other features.

The replacement rules 227 include rules, models, and/or configuration data for the various algorithms or approaches employed by the item replacement engine 218. For example, the replacement rules 242 can include the various models and/or algorithms used by the item replacement engine 218 in identifying and selecting a replacement item for a discontinued or otherwise unavailable item. For example, the replacement rules 242 may include select items according to whether the item is an identical item, whether the item is in a same category of the item catalog 224 as the discontinued item, whether one or more words in item titles 243 match (e.g., identical, synonyms, known to be related, etc.), whether a ratio between quantities between different items is within a predefined threshold (e.g., ratio between quantity of item A and discontinued item B is greater than 0.5 and less than 3.5), and/or other factors.

For example, by applying the replacement rules 242, the item replacement engine 218 can tokenize the item titles 243 to identify matching words (e.g., identical, synonyms, related) between item titles 243. When one or more words in an item title 243 for a particular item in a same category as the discontinued item or otherwise unavailable item are determined to match according to the replacement rules 242, the item replacement engine 218 can determine that the particular item may remain in consideration for being a replacement item.

In some examples, the replacement rules 227 include weights that can be applied to various factors including, for example, item data 239 (e.g., item attributes 241, item title 243, price, etc.), preference data 236, interaction history data 233, and/or other data in determining a similarity between potential replacement items in the item catalog 224 and the discontinued item. In some examples, based at least in part on the replacement rules 227, the item replacement engine 218 can generate a score for each item, rank the scores, and select a highest ranked item as the replacement item for the discontinued item. In some examples, only items having a score that exceeds a predefined threshold are selected and/or considered as a potential replacement item. In some examples, a subset of potential replacement items are identified according to item attributes 241 and item title 243, and after the subset of potential replacement items are identified, the replacement item is selected according to user preference data 236 and/or other factors.

The network content data 230 may include various data employed in generating user interfaces 103 and/or other network pages. The network content data 230 may include hypertext markup language (HTML), extensible markup language (XML), cascading style sheets (CSS), images, text, audio, video, templates, and/or other data.

The client device 206 is representative of a plurality of client devices that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 206 may include a display 246. The display 246 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a client application 249 and/or other applications. The client application 249 may be executed in a client device 206, for example, to access network content served up by the computing environment 203 and/or other servers, thereby rendering a user interface 103 on the display 246. To this end, the client application 249 may comprise, for example, a browser, a dedicated application, etc., and the user interface 103 may comprise a network page, an application screen, etc. The client device 206 may be configured to execute applications beyond the client application 249 such as, for example, email applications, social networking applications, word processors, spreadsheets, and/or other applications.

Next, a general description of the operation of the various components of the networked environment 200 is provided. To begin, a user interacting with the electronic commerce application 215 may want to repurchase items of interest. As such, the user can request to view a listing of previously purchased items. The electronic commerce application 215 can identify the previously purchased items from the interaction history data 233 based on the purchase history and the item identifiers associated with each previously purchased item. According to various embodiments, the electronic commerce application 215 can generate a user interface 103 including the listing of items arranged according to a frequency of purchase, a recency of purchase, a cadence of purchase, a recommendation, and/or other factors.

However, in some situations, an item that a user previously purchased may be discontinued or otherwise be unavailable. An item may be discontinued for a variety of reasons, including, for example, an updated version is available, the item is associated with a different vendor, an issue affecting an ability to process and/or manufacture the item (e.g., diseased crops, drought, materials shortage, regulatory changes, etc.), and/or other reasons as can be appreciated. When an item is discontinued, the item may be removed from the item catalog 224, an offer associated with the item is removed, the item identifier may be deleted and/or otherwise changed, the item may be flagged as being discontinued, and/or other actions may occur to indicate that the item is no longer available for sale, lease, download, rent, etc. via the electronic commerce system.

According to various embodiments, when the electronic commerce application 215 determines that a previously purchased item is unavailable, the item replacement engine 218 can determine if there are any replacement items available for the discontinued item. For example, the item replacement engine 218 can determine a category in the taxonomy of the item catalog 224 and compare item attributes 241, item title 243, and/or other factors associated with the discontinued item with those items included in the item catalog 224 to determine if there are any similarly related items. If there are no other related items in the same category as the discontinued item, the electronic commerce application 215 may present the listing of previously presented items without the discontinued item. In other embodiments, if there are no similarly related items, the electronic commerce application 215 may notify the user that the discontinued item is unavailable.

However, if there are similarly related items included in the same category as the discontinued item, the item replacement engine 218 may analyze each of identified items prior to selecting a replacement item. It should be noted that the replacement item can include an item that was previously available to the user and is not limited to newly added items to the item catalog 224.

In some embodiments, the item replacement engine 218 can apply the replacement rules 227 to select the replacement item. A For example, according to the replacement rules 227, the item replacement engine 218 may evaluate one or more factors (e.g., item attributes 241, item title 243, interaction history 233, preference data 236, etc.) to identify similar items and generate a score for each item based in part on the one or more factors.

According to various embodiments, the replacement rules 227 may define one or more weights to be assigned to each factor associated with the items. In some examples, the weights assigned to the different factors can vary. For example, attributes associated with the discontinued item can be compared to attributes associated with the prospective replacement item. If there is a match between two attributes, the replacement item may be assigned a particular weight (e.g., positive weight). Likewise, if there is not a match between attributes, the replacement item may be assigned another weight (e.g., negative, zero). Further, based on the type of factor, the weights may vary according to a level of importance associated with the factor. In some embodiments, the level of importance can be based at least in part on the preference data 236 associated with the user (e.g., organic vs. non-organic preference).

In other embodiments, the level of importance is predefined. For example, a similarity in quantity may be considered to have a greater level of importance than a similarity between sizes. As such, a similarity in quantity between the items may be assigned a greater weight than a size of the items.

For example, assume that the discontinued item corresponds to a single ripe avocado with an item title 243 of "Single Avocado," and the category of avocados includes single ripe avocados, single unripe avocados, a bag of avocados, organic avocados, etc. To this end, item replacement engine 218 may determine based at least in part on an item title 243 and item attributes 241 that another item that corresponds to a single ripe avocado with an item title 243 of "Avocado" is more similar to an item that corresponds to a single unripe avocado having an item title 243 "Avocado" or a bag of ripe avocados having an item title 243 of "4-pack of Avocados."

In some examples, the item replacement engine 218 may determine a ratio between the quantity associated with a particular item and a quantity associated with the discontinued item. If the ratio is within a predefined threshold or threshold range, the item may continue to be considered as a potential replacement item. If the ratio is outside of a predefined threshold range, the item may be eliminated from consideration or may receive a lower and/or negative weight with respect to quantity.

In some examples, a context associated with a current user experience may be a factor associated with identifying similar items. For example, the item replacement engine 218 may be able to identify already selected items of interest associated with a particular shopping experience and may be able to determine that the items are all related to a particular context, such as, for example, a recipe. If the unavailable item is an apple and the context is identified as shopping for items to make a pie, the item replacement engine 218 may identify cherries instead of the discontinued apple.

Upon analyzing each of the identified similar items, the item replacement engine 218 may rank the similar items based at least in part on the score and select a replacement item according to the ranking. After selecting a replacement item, the item replacement engine 218 can associate the interaction history data 233 corresponding to the discontinued item with the replacement item. For example, the interaction history data 233 can be modified to include the interaction history data 233 associated with the discontinued item. In another example, if there is no current interaction history data 233 for the replacement item, interaction history data 233 for the replacement item can be created and modified to include the interaction history data 233 of the discontinued item.

As such, while the user may not have previously purchased the replacement item, the replacement item can be viewed as an actual replacement of the discontinued item. To this end, when items are ranked or otherwise arranged according to frequency of purchase, recency of purchase, a cadence of purchase, recommendations, and/or other factors, the replacement item does not lose the priority that may have been associated with the discontinued item.

Once a replacement item is selected and replacement item is associated with the interaction history of the discontinued item, the electronic commerce application 215 can generate a user interface 103 including a listing of previously purchased items to be rendered on a display 246 of the client device 206. According to various embodiments, the user interface 103 can include multiple item listings 106 that are associated with items that the user has previously purchased.

In some embodiments, the user interface 103 can arrange the presentation order of the item listings 106 according to a frequency of purchase, a recency of purchase, recommendations, a cadence of purchase, or other factors as can be appreciated. The user interface 103 can include an item listing 106 (FIG. 1) for the replacement item for the discontinued item.

According to various embodiments, the item listing 106 for the replacement item can include a notification 109 (FIG. 1) that indicates to the user that the item has been updated or that otherwise notifies the user that there is additional information for the user with respect to the particular item. For example, in some embodiments, the notification 109 may include a badge that indicates that the item is updated. In other embodiment, the notification 109 may include a symbol or another type of visual cue to indicate to the user that the item is updated or otherwise different.

In some embodiments, the item listing 106 may include a user interface component associated with the replacement item that, in response to a user interaction (e.g., hover action, component selection, etc.), causes a user interface view to be modified to include additional information regarding the replacement item. The user interface component 306 (FIG. 3A), when rendered, may include any number of user interface elements, such as, for example, checkboxes, buttons, radio buttons, form fields, images, text labels, links, sliders, spinners, drop-down boxes, and so on. In some embodiments, the user interface component 306 is hidden. In other embodiments, the user interface component 306 is visible.

According to various embodiments, the user interface view can be modified to include a user interface element 309 (FIG. 3B) that provides an explanation that the replacement item has replaced the discontinued item. According to various embodiments, the user interface element 309 may comprise an overlay interface, a pop-up component, a card component or other type of inline expansion component, and/or other type of user interface object as can be appreciated. For example, in response to a user selecting on a user interface component 306 associated with the item listing 106 of the replacement item, the user interface 103 can be modified such that a user interface element 309 (e.g., a card component) slides down as an inline expansion to provide additional information associated with the replacement item. The additional information can include an explanation that the replacement item has replaced the discontinued item. The user interface element 309 can further include selectable components that allow a user to remove the item from consideration and/or initiate the purchase of the item.

In some embodiments, in response to a detected user action, the client device 206 rendering the user interface 103 can transmit the interaction data associated with the user interaction with the user interface component 306 to the electronic commerce application 215. Upon receipt of the user interaction data, the electronic commerce application 215 may generate an updated user interface 103 that includes additional information about the replacement item. For example, the updated user interface 103 can include a card component, pop-up box, or other type of user interface element 309 that provides additional information to the user. Upon generating the updated view, the electronic commerce application 215 transmits the updated user interface 103 to the client device 206 for rendering.

In other embodiments, the user interface 103 may comprise user interface code for imparting functionality to the user interface component 306 and for rendering subsequent views of the user interface component 306 in the client device 206. For example, the client application 249 may execute the user interface code of the user interface 103 to generate an updated user interface view that includes a user interface element 309 that presents the additional information to the user.

Figure 3A:
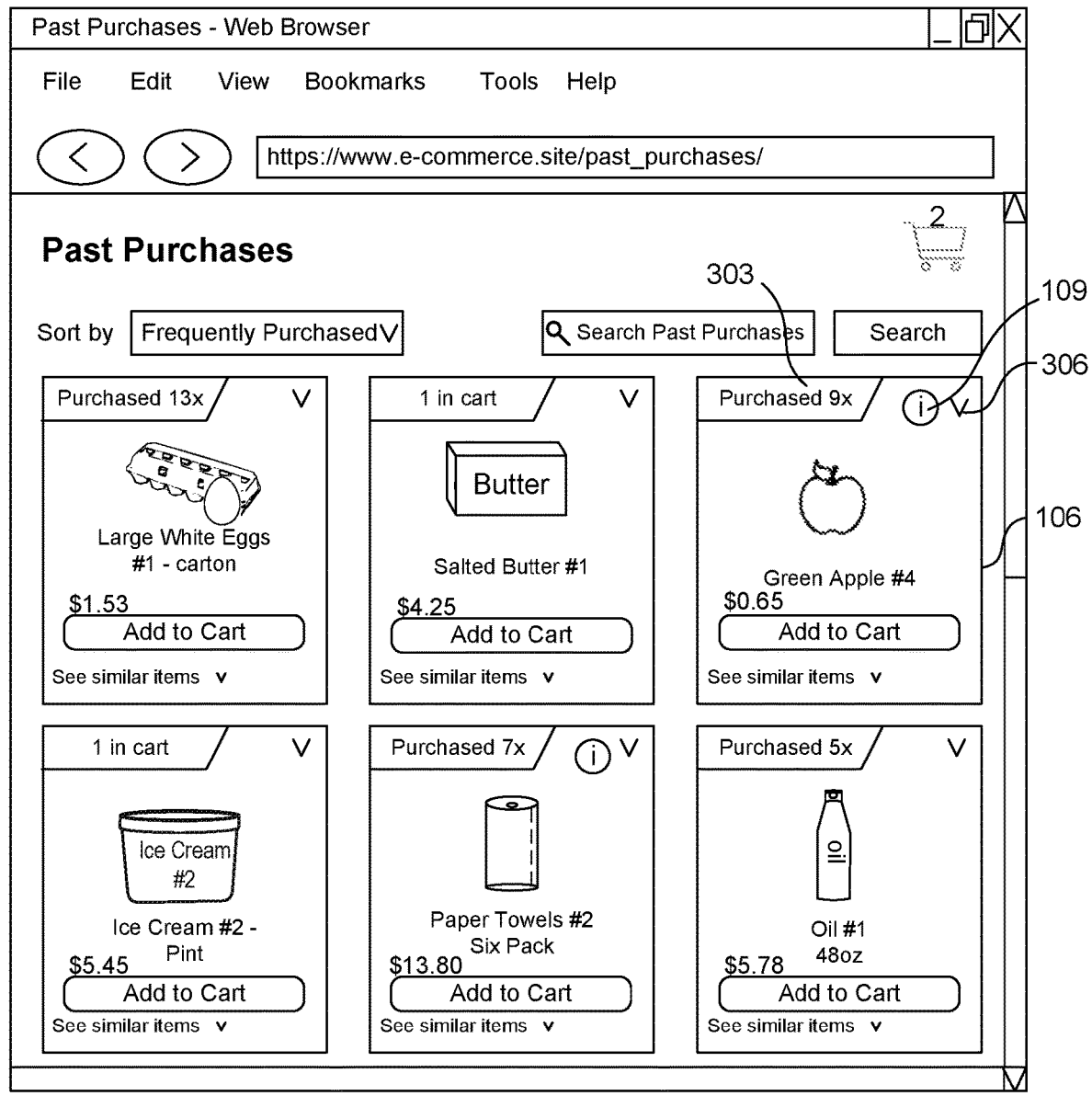
FIGS. 3A-4D are pictorial diagrams of example user interfaces rendered by a client device in the networked environment of FIG. 2 according to various embodiments of the present disclosure.

Turning now to FIGS. 3A-4D, shown are example user interfaces 103 including item listings 106 for replacement items according to various embodiments of the present disclosure. In particular, FIGS. 3A-3C illustrate example user interfaces 103 associated with desktop or laptop device views and FIGS. 4A-4D illustrate example user interfaces 103 associated with mobile device views. It should be noted that the user interface views and/or user interface elements 309 discussed with respect to FIGS. 3A-4D are not limited to use on mobile devices or desktop or laptop devices, respectively, and can be interchanged as can be appreciated. The user interfaces 103 of FIGS. 3A-4D provide examples of replacement items being presented to the users and how interactions with the various user interface components 306 cause additional information with respect to the replacement item.

Referring next to FIG. 3A, shown is an example of a user interface 103b including a listing of previously purchased items arranged pursuant to frequency according to various embodiments of the present disclosure. The user interface 103b includes an item listing 106 associated with a replacement item. In particular, the item listing 106 associated with "Green Apple #4" is updated according to the notification 109 included in the item listing. In FIG. 3A, the item listing further includes an arrangement marker 303 that indicates a frequency associated with the item. The arrangement marker 303 for the replacement item in item listing 106 corresponds to the frequency of purchases associated with the discontinued item that the replacement item replaced since the purchase history of the discontinued item was transferred to the replacement item.

FIG. 3A further includes a user interface component 306 that in response to user interaction causes additional information to be displayed for the user. The additional information can include an explanation that the replacement item has replaced the previously purchased discontinued item. In FIG. 3A, the user interface component 306 corresponds to a selectable component that, when selected by the user, provides the information to the user.

Figure 3B:
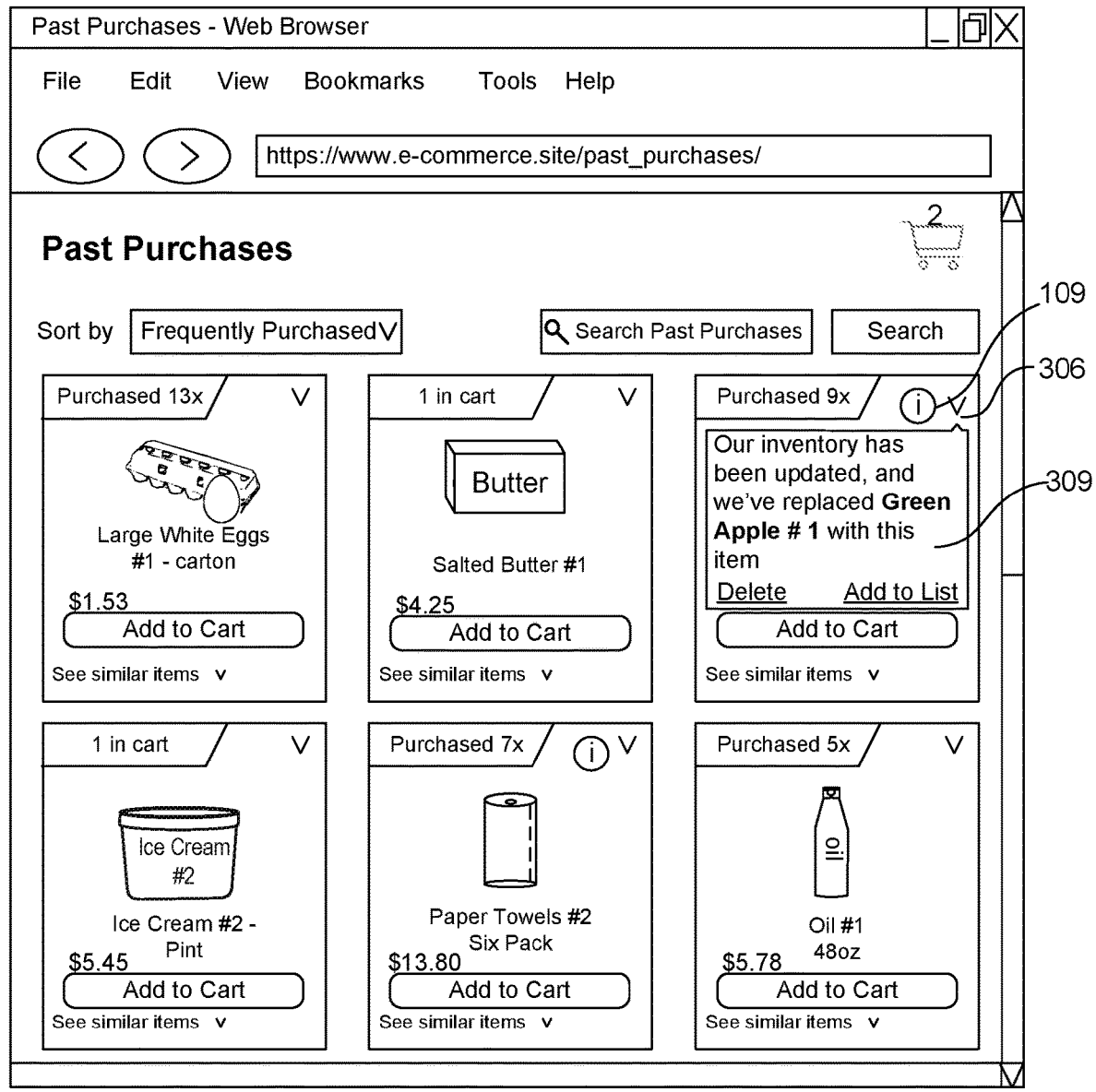

FIG. 3B illustrates an example user interface 103c that may be displayed in response to a user interaction with the user interface component 306 of FIG. 3A in accordance to various embodiments of the present disclosure. As shown in FIG. 3B, a user interface element 309 in the form of a drop-down box is presented. The user interface element 309 provides an explanation that the replacement item is a replacement of the discontinued item. According to various embodiments, the user interface element 309 may also include selectable components that allow the user to remove the item from consideration and/or add the item to the list of previously purchased items.

Figure 3C:
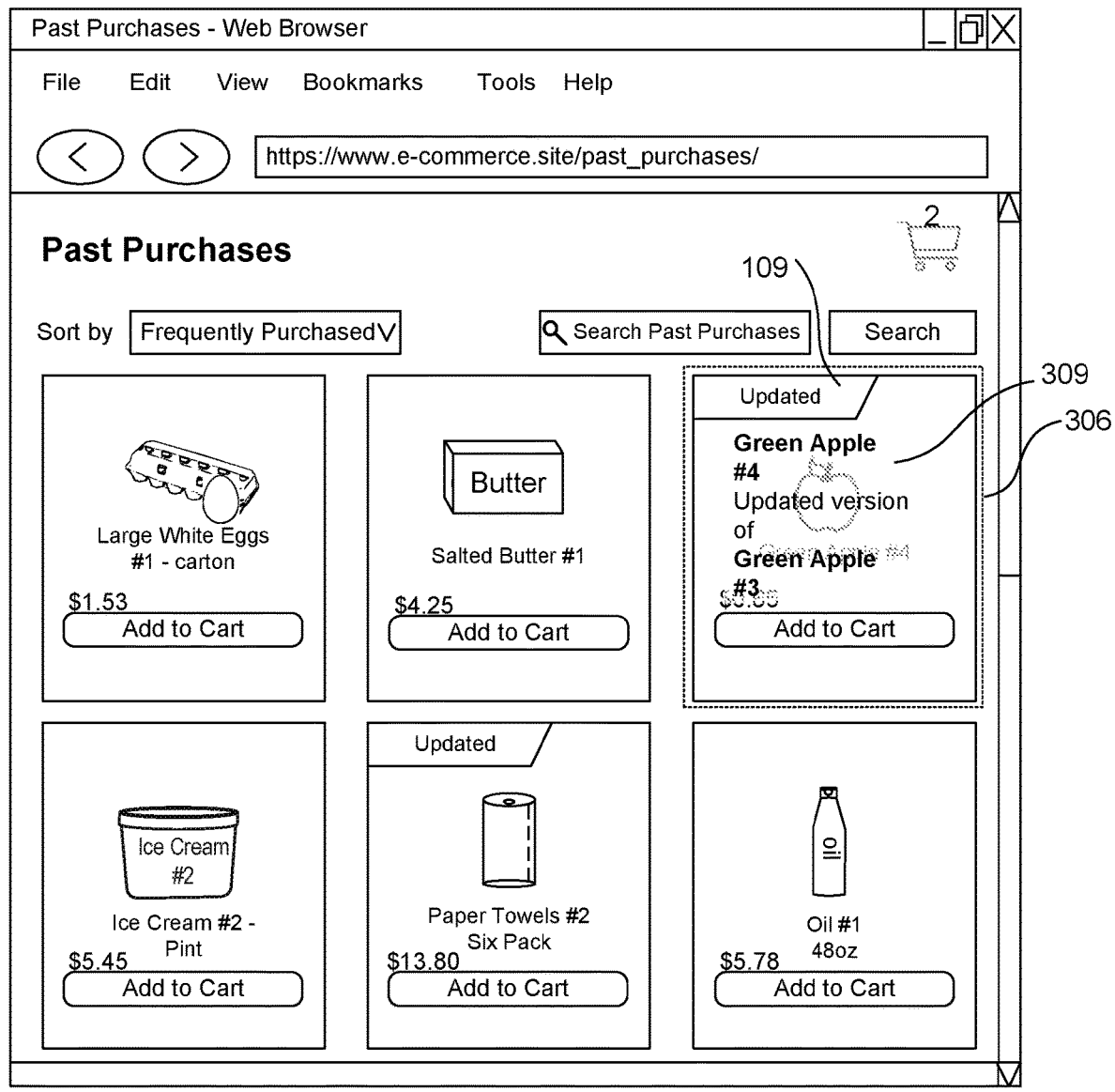

FIG. 3C illustrates an example user interface 103d that may be displayed in response to a user interaction with a user interface component 306 included in an item listing 106 (FIG. 1) for a replacement item according to various embodiments of the present disclosure. In this example, the user interface component 306 is not visible. However, the user interface component 306 corresponds to a predefined area of the user interface 103 such that an action associated with the user interface component 306 is triggered in response to a user interaction within the predefined area associated with the user interface component 306. For example, the user interface component 306 can correspond to the area or a portion of the area associated with the item listing 106. The user interface component 306 can be triggered by a user selection, hovering action, or other type of interaction as can be appreciated.

In response to the user interaction with the user interface component 306, the user interface 103 can be modified to include a user interface element 309 that provides additional information about the replacement item. In FIG. 3C, the user interface element 309 is shown as an overlay that is rendered over the item listing 106. In other embodiments, the user interface element 309 may include a card component or other type of inline expansion component, a pop-up box, or other type of user interface element as can be appreciated.

Figure 4A:
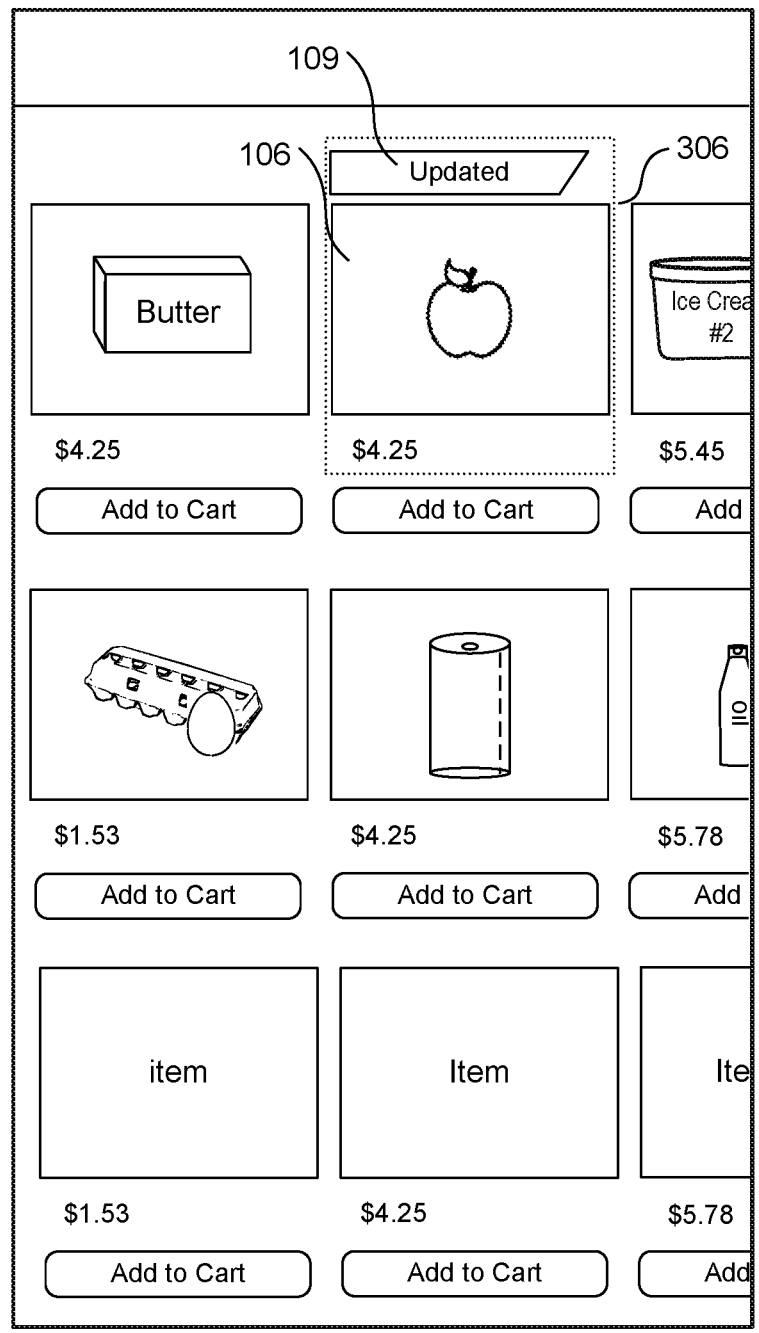

Turning now to FIG. 4A, shown is an example of a user interface 103e for a mobile device that includes a listing of previously purchased items where a replacement item has replaced a discontinued item according to various embodiments of the present disclosure. In FIG. 4A, the item listing 106 associated with the apple includes a notification 109 that indicates that the item has been updated. Further, in FIG. 4A, the user interface 103e includes a user interface component 306, that upon interaction, triggers a modification of the user interface 103 to include additional information. In the example of FIG. 4A, the user interface component 306 in not visible to the user. However, the user interface component 306, denoted by the dotted lines, corresponds to a predefined display area of the user interface 103 that in response to a user interaction with the defined display area, the user interface component 306 is triggered to perform a particular action. However, in other examples, the user interface component 306 can include any type of visible or hidden user interface component 306 as can be appreciated.

Figure 4B:
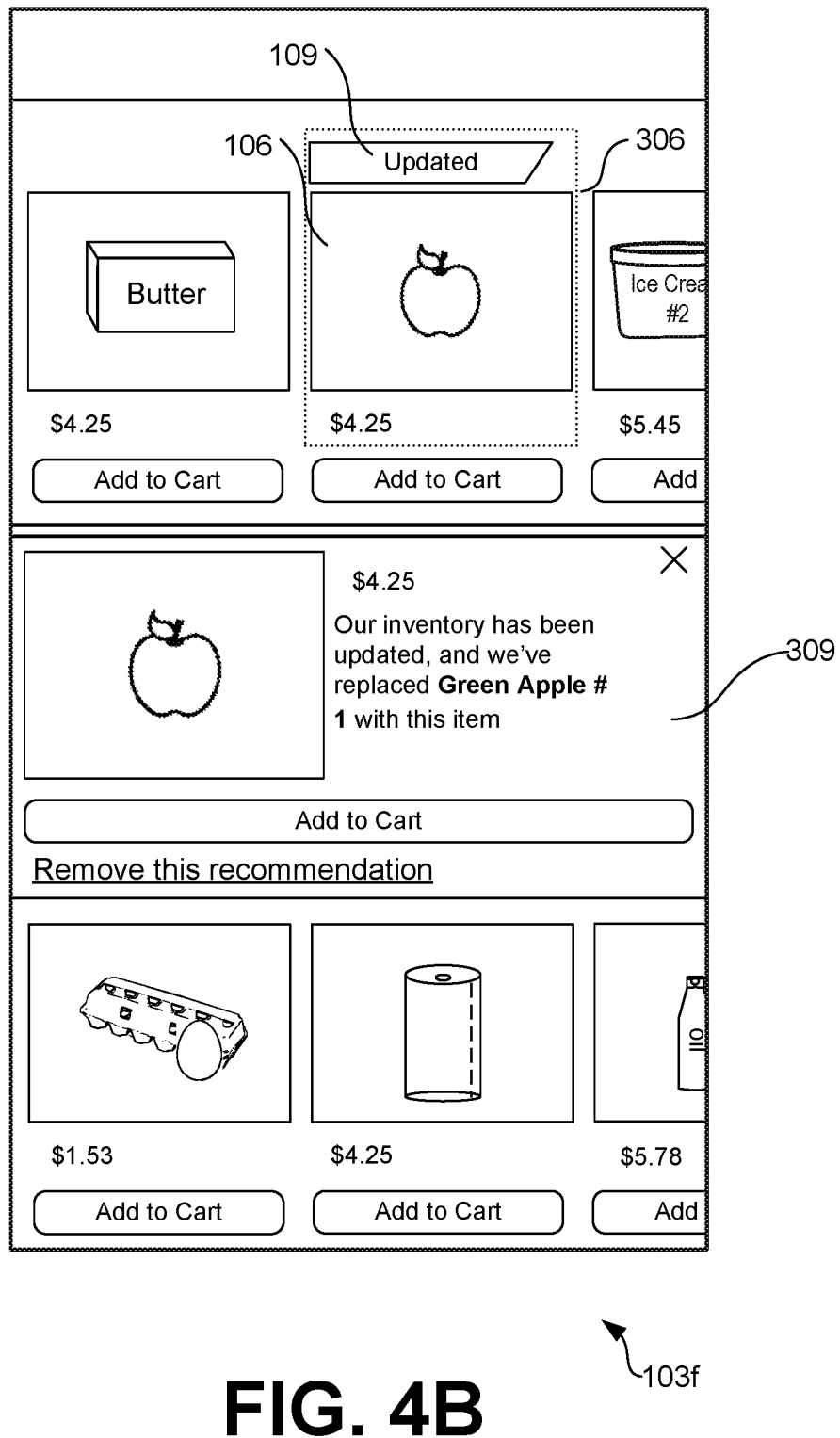

Moving on to FIG. 4B, shown is an example user interface 103f that may be displayed as a result to a user interaction with the user interface component 306 of FIG. 4A according to various embodiments of the present disclosure. In FIG. 4B, the user interface element 309 includes a card component that provides an inline expansion by sliding down under the row of item listings 106 that includes the replacement item. In FIG. 4B, the user interface element 309 is positioned below the first row of item listings 106 and above the second row of item listings 106. The user interface element 309 includes additional information about the replacement item, including an explanation that the item has replaced the discontinued item. Further, the user interface element 309 includes selectable components that allow a user to add the item to a shopping cart and/or remove the item from consideration. According to various embodiments, the user interface element 309 includes a component that closes the user interface element 309 to allow the user interface to return to the original state (e.g., user interface 103e).

Figure 4C:
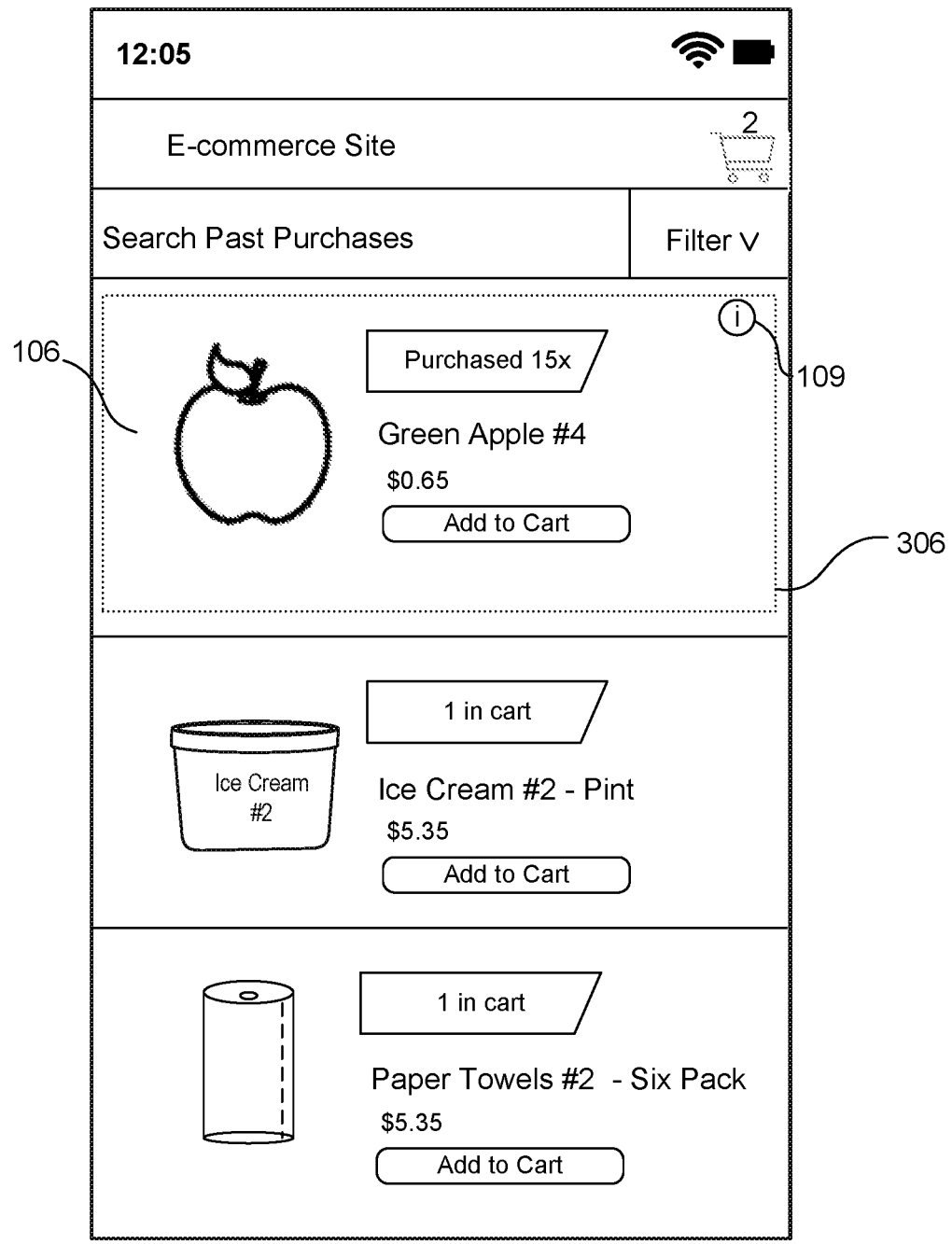

Referring next to FIG. 4C, shown is another example of a user interface 103g for a mobile device that includes a listing of previously purchased items where a replacement item is included instead of a discontinued item. In FIG. 4C, the item listing 106 for the replacement item includes a notification 109 that indicates that the item has been updated. Further, in FIG. 4C, the user interface 103g includes a user interface component 306, that upon interaction, triggers a modification of the user interface 103 to include additional information. In the example of FIG. 4C, the user interface component 306 includes a hidden selectable component.

Figure 4D:
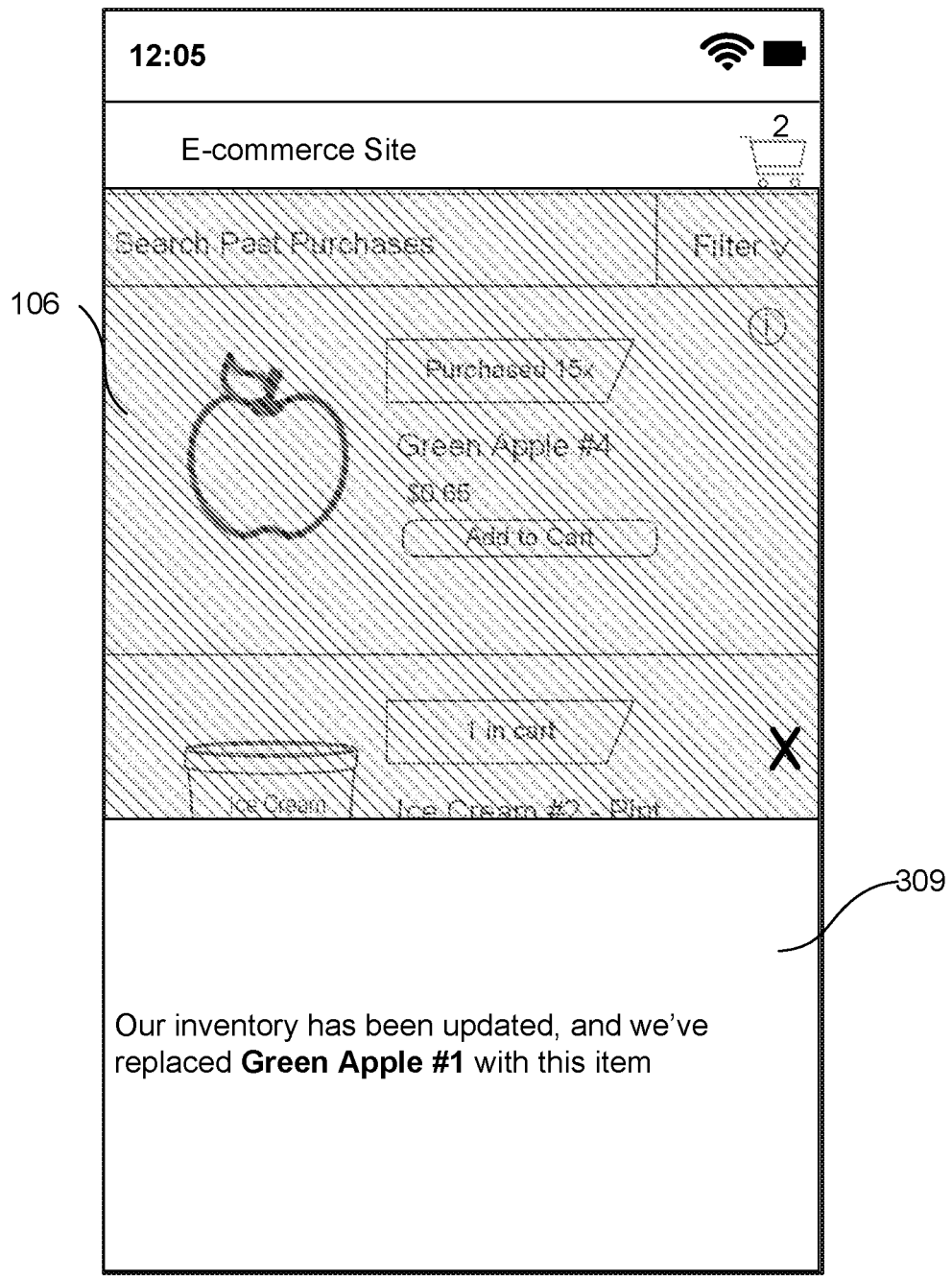

Moving on to FIG. 4D, shown is an example user interface 103h that may be displayed as a result of a user interaction with the user interface component 306 of FIG. 4C according to various embodiments of the present disclosure. In FIG. 4D, the user interface element 309 includes a pop-up box that includes additional information about the replacement item. In addition, user interface element 309 causes the underlying content to be inaccessible while the user interface element 309 is displayed. According to various embodiments, the user interface element 309 includes a component that closes the user interface element 309 to allow the user interface 103 to return to the original state (e.g., user interface 103g).

Figure 5:
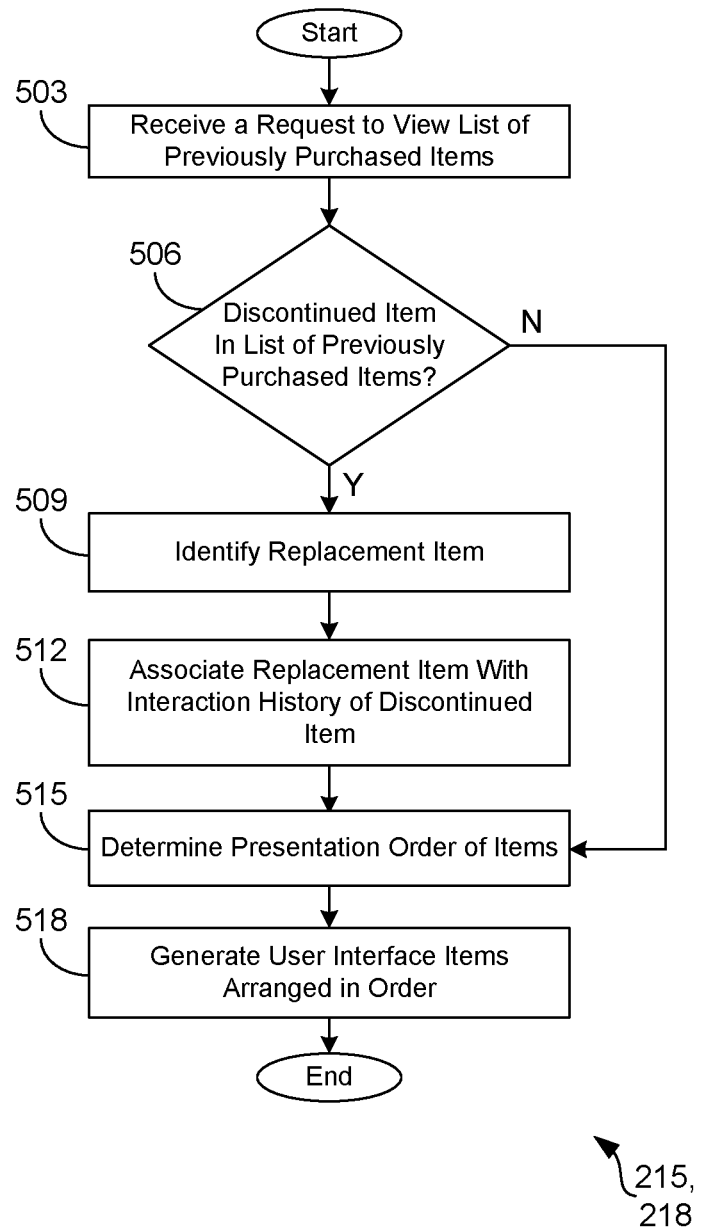
FIGS. 5 and 6 are flowcharts illustrating examples of functionality implemented as portions of an electronic commerce application and an item replacement engine executed in a computing environment in the networked environment of FIG. 2 according to various embodiments of the present disclosure.

Referring next to FIG. 5, shown is a flowchart that provides one example of the operation of portions of the electronic commerce application 215, the item replacement engine 218, and/or other applications according to various embodiments. It is understood that the flowchart of FIG. 5 provides merely an example of the many different types of functional arrangements that may be employed to implement the operation of the portions of the electronic commerce application 215, the item replacement engine 218, and/or other applications as described herein. As an alternative, the flowchart of FIG. 5 may be viewed as depicting an example of elements of a method implemented in the computing environment 203 (FIG. 2) according to one or more embodiments.

Beginning with box 503, the electronic commerce application 215 receives a request to view a list of previously purchased items. For example, a user interacting with a user interface 103 (FIG. 1) associated with the electronic commerce application 215 and rendered on a display 246 (FIG. 2) of a client device 206 (FIG. 2) may select a component that corresponds to a request to view previously purchased items. The electronic commerce application 215 may analyze the interaction history data 233 (FIG. 2) to identify items that have been previously purchased by the user.

At box 506, the electronic commerce application 215 determines if any of the previously purchased items are discontinued. An item may be discontinued for a variety of reasons, including, for example, an updated version is available, the item is associated with a different vendor, an issue affecting an ability to process and/or manufacture the item (e.g., diseased crops, drought, steel shortage, etc.) and/or other reasons as can be appreciated. When an item is discontinued, the item may be removed from the item catalog 224 (FIG. 2), an offer associated with the item is removed, the item identifier may be deleted and/or otherwise changed, the item may be flagged as being discontinued, and/or other actions may occur to indicate that the item is no longer available for sale, lease, download, rent, etc. via the electronic commerce system. Accordingly, the electronic commerce application 215 may determine that an item is discontinued based on an evaluation of the item catalog 224. If an item is determined to be discontinued, the electronic commerce application 215 proceeds to box 509. Otherwise, the electronic commerce application 215 proceeds to box 515.

At box 509, the item replacement engine identifies a replacement item. As will be discussed in FIG. 7, the item replacement engine 218 may identify items that are in the same item category in the item catalog 224 as the discontinued item. By applying the replacement rules 227 (FIG. 2), the item replacement engine 218 evaluates a variety of factors associated with the identified items in comparison with the discontinued items and/or preference data 236 (FIG. 2) of the user to select the replacement item. For example, the item replacement engine 218 may assign weights to various factors and assign a score for each item according to a sum of the weighted factors. The item replacement engine 218 may rank the items and select the highest ranked item as the replacement item for the discontinued item.

At box 512, the item replacement engine 218 associates the replacement item with the interaction history of the discontinued item. To this end, the replacement item does not lose a priority that would otherwise be given to the discontinued item when the item is ranked or otherwise arranged according to frequency of purchase, recency of purchase, a cadence of use, recommendation, or other factors. For example, if the user had never purchased the replacement item, but the discontinued item had been purchased fifteen times, the replacement item would be considered to have been purchased fifteen times because the purchase history of the replacement item incudes the purchase history of the discontinued item.

At box 515, the electronic commerce application 215 determines a presentation order for the previously purchased items. For example, the previously purchased items can be arranged according to frequency of purchase, recency of purchase, a cadence of purchase recommendation, or other form of arrangement. If a replacement item has replaced a discontinued item in the list of previously purchased items, the replacement item is provided the priority of the discontinued item and is arranged in a position that would have previously been used for the discontinued item.

At box 518, the electronic commerce application 215 generates a user interface 103 with the item listings 106 for each of the previously purchased items. The item listings 106 are arranged in the order that was determined at box 515. The electronic commerce application 215 can then transmit the user interface 103 to a client device 206 for rendering. As such, this portion of the process proceeds to completion.

Figure 6:
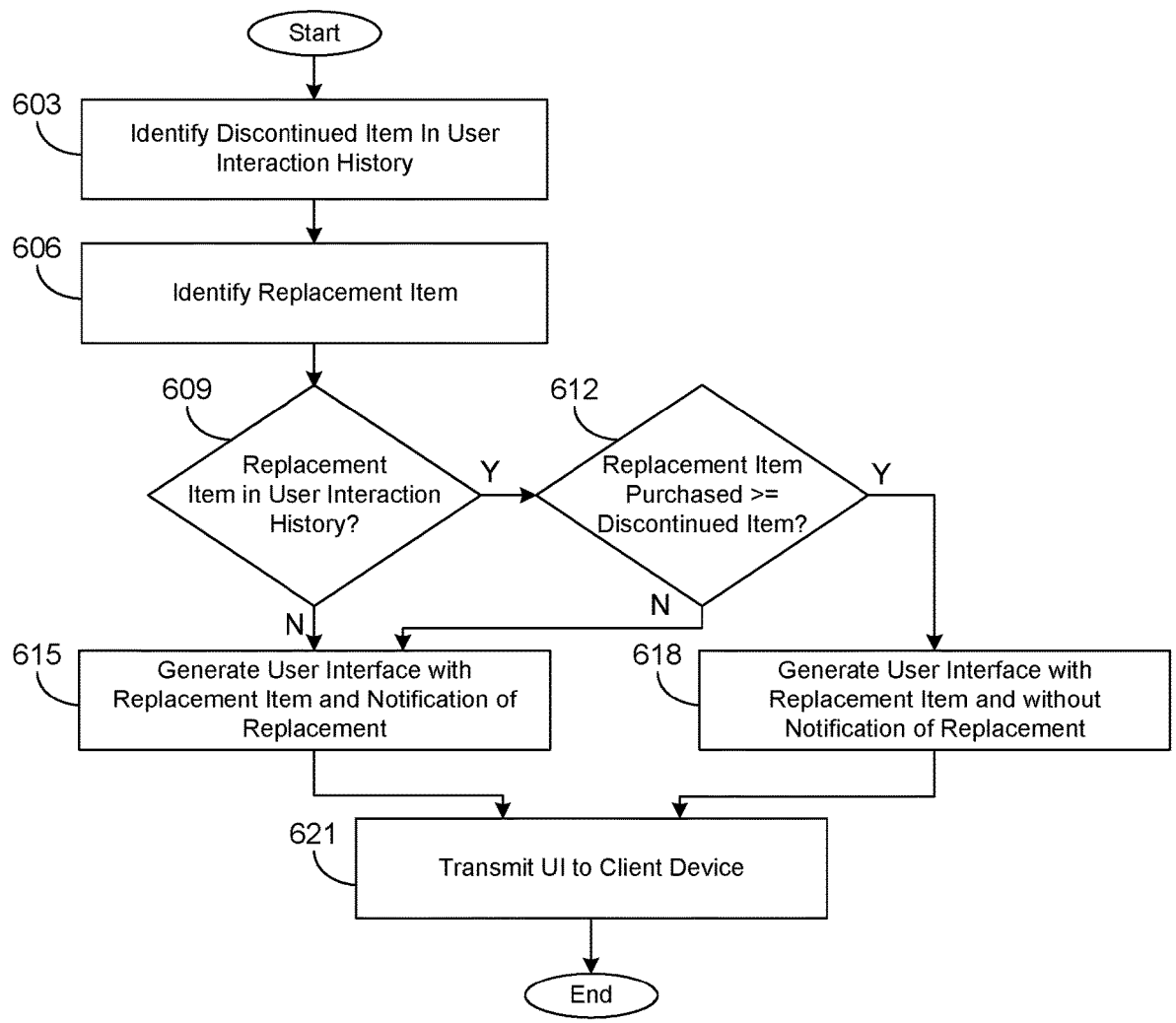

Referring next to FIG. 6, shown is a flowchart that provides one example of the operation of portions of the electronic commerce application 215, the item replacement engine 218, and/or other applications according to various embodiments according to various embodiments. It is understood that the flowchart of FIG. 6 provides merely an example of the many different types of functional arrangements that may be employed to implement the operation of the portions of the electronic commerce application 215, the item replacement engine 218, and/or other applications according to various embodiments as described herein. As an alternative, the flowchart of FIG. 6 may be viewed as depicting an example of elements of a method implemented in the computing environment 203 (FIG. 2) according to one or more embodiments.

Beginning with box 603, the electronic commerce application 215 identifies a previously purchased item that is discontinued. An item may be discontinued for a variety of reasons, including, for example, an updated version is available, the item is associated with a different vendor, an issue affecting an ability to process and/or manufacture the item (e.g., diseased crops, drought, material shortages, regulatory changes, etc.) and/or other reasons as can be appreciated. When an item is discontinued, the item may be removed from the item catalog 224 (FIG. 2), an offer associated with the item is removed, the item identifier may be deleted and/or otherwise changed, the item may be flagged as being discontinued, and/or other actions may occur to indicate that the item is no longer available for sale, lease, download, rent, etc. via the electronic commerce system. Accordingly, in some embodiments, the electronic commerce application 215 may determine that an item is discontinued based on an evaluation of the item catalog 224.

At box 606, the item replacement engine 218 identifies a replacement item. As will be discussed in FIG. 7, the item replacement engine 218 may identify items that are in the same item category in the item catalog 224 as the discontinued item. By applying the replacement rules 227 (FIG. 2), the item replacement engine 218 may evaluate a variety of factors associated with the identified items in comparison with the discontinued items and/or preference data 236 (FIG. 2) of the user to select the replacement item.

At box 609, the electronic commerce application 215 may determine if the replacement item is included in the user interaction history data 233 (FIG. 2). For example, prior to merging the interaction history data 233 of the discontinued item with the interaction history data 233 associated with the replacement item, the electronic commerce application 215 may determine if the user has previously interacted with (e.g., purchased) the replacement item in prior interactions. If the electronic commerce application 215 determines that the replacement item is not included in the user interaction history data 233, the electronic commerce application 215 proceeds to box 615. Otherwise, the electronic commerce application proceeds to box 612.

At box 612, the electronic commerce application 215 determines if the number of interactions (e.g., purchases) with the replacement item meets or exceeds the number of interactions with the discontinued item. If the number of interactions with the replacement item is less than those of the discontinued item, the electronic commerce application 215 proceeds to box 615. Otherwise, the electronic commerce application 215 proceeds to box 618.

At box 615, the electronic commerce application 215 generates a user interface 103 (FIG. 1) to include an item listing 106 (FIG. 1) for the replacement item. Since there has not been a prior interaction associated with the replacement item or the interactions with the discontinued item are greater than those with the with the replacement item, the electronic commerce application 215 further includes a notification 109 (FIG. 1) of the replacement with respect to other item listings. For example, the notification 109 can include a badge, information symbol, or other type of notification that may indicate to the user that item is updated or is otherwise different.

At box 618, the electronic commerce application 215 generates a user interface 103 to include an item listing 106 for the replacement item. Since interactions associated with the replacement item meet or exceed those of the discontinued item, the electronic commerce application 215 does not include a notification 109 with the item listing 106 to inform the user that there has been an update or other type of change.

At box 621, the electronic commerce application 215 transmits the user interface 103 to the client device 206, and the process proceeds to completion.

Figure 7:
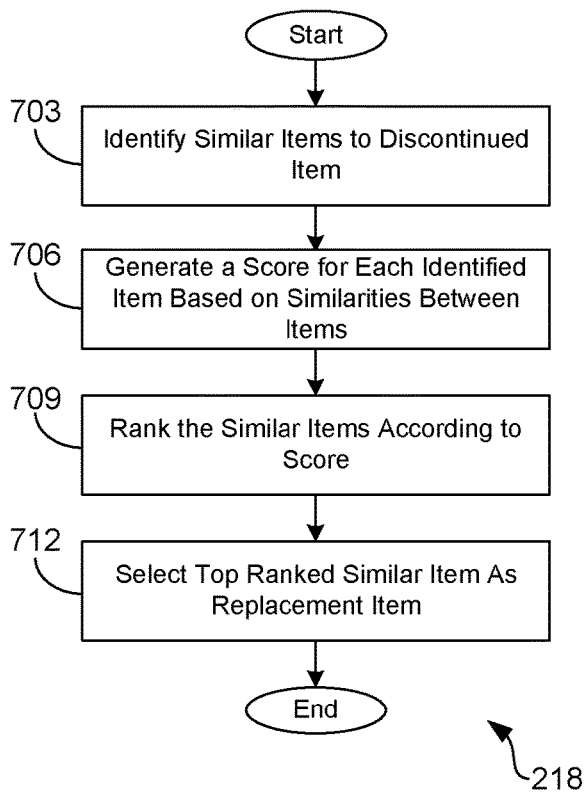
FIG. 7 is a flowchart illustrating one example of functionality implemented as portions of the item replacement engine executed in a computing environment in the networked environment of FIG. 2 according to various embodiments of the present disclosure.

Referring next to FIG. 7, shown is a flowchart that provides one example of the operation of a portion of the item replacement engine 218 according to various embodiments. It is understood that the flowchart of FIG. 7 provides merely an example of the many different types of functional arrangements that may be employed to implement the operation of the portion of the item replacement engine 218 as described herein. As an alternative, the flowchart of FIG. 7 may be viewed as depicting an example of elements of a method implemented in the computing environment 203 (FIG. 2) according to one or more embodiments.

Beginning with box 703, the item replacement engine 218 identifies items that are similar to a discontinued item. For example, the item catalog 224 (FIG. 2) can be organized according to a taxonomy of categories of item type. As such, the discontinued item can be one of multiple items of the same item type that are included in the same category. To this end, the item replacement engine 218 may identify the other items in the same category as the discontinued item.

At box 706, the item replacement engine 218 can generate a score for each identified item based at least in part on similarities between the items. For example, the item replacement engine 218 may apply the replacement rules 227 (FIG. 2) to analyze various factors associated with the different items. The factors may include for example, item data (e.g., attributes, item title, price, etc.), interaction history data 233 (FIG. 2), preference data 236 (FIG. 2), and/or other factors. For example, item attributes 241 (FIG. 2), item titles 243 (FIG. 2), and other factors associated with the identified items can be compared with the discontinued item to determine a similarity. In some embodiments, the item replacement engine 218 can assign a weight to one or more of the factors. The sum of the weighted factors can be used as the score for each of the items. In some embodiments, the user preference data 236 can be applied such that the scores assigned to the items further reflect known or otherwise learned user data 221.

At box 709, the item replacement engine 218 can rank the identified items according to the scores. At box 712, the item replacement engine 218 can select a top-ranked item as the replacement item. Thereafter, this portion of the item replacement engine 218 ends.

Figure 8:
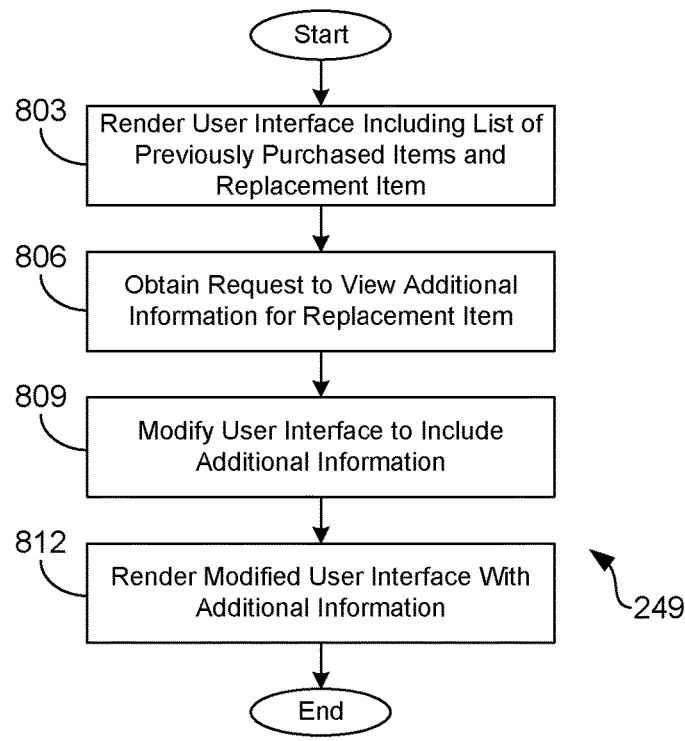
FIG. 8 is a flowchart illustrating one example of functionality implemented as a portion of a client application executed in a client device in the networked environment of FIG. 2 according to various embodiments of the present disclosure.

Referring next to FIG. 8, shown is a flowchart that provides one example of the operation of a portion of the client application 249 (FIG. 2) or other applications according to various embodiments. It is understood that the flowchart of FIG. 8 provides merely an example of the many different types of functional arrangements that may be employed to implement the operation of a portion of the client application 249 as described herein. As an alternative, the flowchart of FIG. 8 may be viewed as depicting an example of elements of a method implemented in the client device 206 (FIG. 2) according to one or more embodiments.

Beginning with box 803, the client application 249 renders a user interface 103 (FIG. 1) received from the electronic commerce application 215 that includes a list of previously purchased items. Included in the list of previously purchased items is a replacement item for a previously purchased item that has been discontinued.

At box 806, the client application 249 obtains a request to view additional information with respect to the replacement item. For example, an item listing 106 (FIG. 1) associated with the replacement item may provide a notification 109 (FIG. 1) that the replacement item has been updated or is otherwise different. In addition, the item listing 106 may include a user interface component 306 (FIG. 3A) associated with the replacement item that in response to a user interaction (e.g., hover action, component selection, etc.), causes a user interface view to be modified to include additional information regarding the replacement item. The user interface component 306, when rendered, may include any number of user interface elements, such as, for example, checkboxes, buttons, radio buttons, form fields, images, text labels, links, sliders, spinners, drop-down boxes, and so on. The request to view additional information with respect to the replacement item may be in response to a user interaction with the user interface component 306.

At box 809, the client application 249 modifies the user interface 103 to include additional information about the replacement item. For example, the additional information may include an explanation that the replacement item has replaced the discontinued item. In some embodiments, the user interface 103 comprises user interface code that can be executed by the client application 249 in response to a user interaction with the user interface component 306. In other embodiments, the client application 249 notifies the electronic commerce application 215 of the interaction and the electronic commerce application 215 generates and transmits a modified user interface 103 according to the user interaction.

According to various embodiments, the user interface 103 can be modified to include additional information about the replacement item. For example, the user interface 103 can be modified to include a pop-up box that includes information regarding the replacement item. In another example, the user interface 103 can be modified to include an overlay component that includes the additional information. In another example, the user interface 103 can be modified such that a card component containing the additional information is presented relative to the item listing 106.

At box 812, the client application 249 renders the modified user interface 103 and this portion of the client application 249 proceeds to completion.

Figure 9:
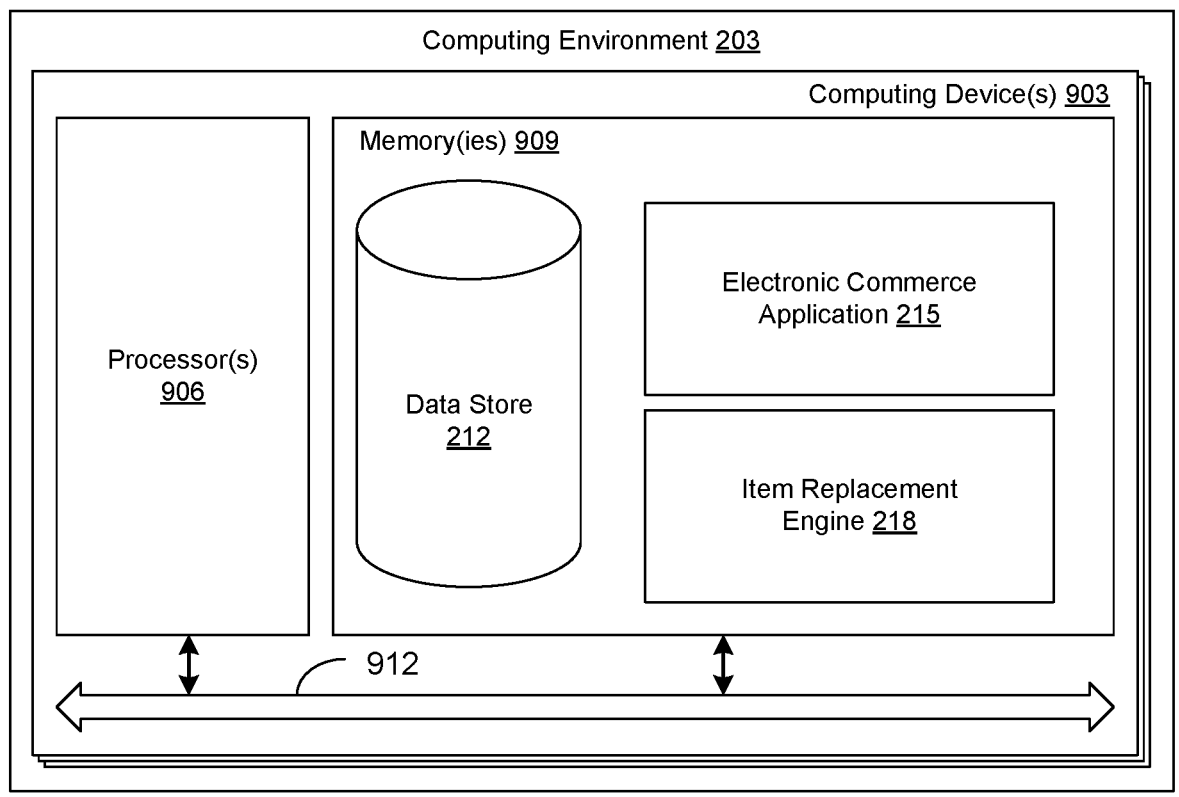
FIG. 9 is a schematic block diagram that provides one example illustration of a computing environment employed in the networked environment of FIG. 2 according to various embodiments of the present disclosure.

With reference to FIG. 9, shown is a schematic block diagram of the computing environment 203 according to an embodiment of the present disclosure. The computing environment 203 includes one or more computing devices 903. Each computing device 903 includes at least one processor circuit, for example, having a processor 906 and a memory 909, both of which are coupled to a local interface 912. To this end, each computing device 903 may comprise, for example, at least one server computer or like device. The local interface 912 may comprise, for example, a data bus with an accompanying address/control bus or other bus structure as can be appreciated.

Stored in the memory 909 are both data and several components that are executable by the processor 906. In particular, stored in the memory 909 and executable by the processor 906 are the electronic commerce application 215, the item replacement engine 218, and potentially other applications. Also stored in the memory 909 may be a data store 212 and other data. In addition, an operating system may be stored in the memory 909 and executable by the processor 906.

It is understood that there may be other applications that are stored in the memory 909 and are executable by the processor 906 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 909 and are executable by the processor 906. In this respect, the term "executable" means a program file that is in a form that can ultimately be run by the processor 906. Examples of executable programs may be, for example, a compiled program that can be translated into machine code in a format that can be loaded into a random access portion of the memory 909 and run by the processor 906, source code that may be expressed in proper format such as object code that is capable of being loaded into a random access portion of the memory 909 and executed by the processor 906, or source code that may be interpreted by another executable program to generate instructions in a random access portion of the memory 909 to be executed by the processor 906, etc. An executable program may be stored in any portion or component of the memory 909 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 909 is defined herein as including both volatile and nonvolatile memory and data storage components. Volatile components are those that do not retain data values upon loss of power. Nonvolatile components are those that retain data upon a loss of power. Thus, the memory 909 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 906 may represent multiple processors 906 and/or multiple processor cores and the memory 909 may represent multiple memories 909 that operate in parallel processing circuits, respectively. In such a case, the local interface 912 may be an appropriate network that facilitates communication between any two of the multiple processors 906, between any processor 906 and any of the memories 909, or between any two of the memories 909, etc. The local interface 912 may comprise additional systems designed to coordinate this communication, including, for example, performing load balancing. The processor 906 may be of electrical or of some other available construction.

Although the electronic commerce application 215, the item replacement engine 218, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5-8 show the functionality and operation of an implementation of portions of the electronic commerce application 215, item replacement engine 218, the client application 249, and/or other applications. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 906 in a computer system or other system. The machine code may be converted from the source code, etc. If embodied in hardware, each block may represent a circuit or a number of interconnected circuits to implement the specified logical function(s).

Although the flowcharts of FIGS. 5-8 show a specific order of execution, it is understood that the order of execution may differ from that which is depicted. For example, the order of execution of two or more blocks may be scrambled relative to the order shown. Also, two or more blocks shown in succession in FIGS. 5-8 may be executed concurrently or with partial concurrence. Further, in some embodiments, one or more of the blocks shown in FIGS. 5-8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 215, item replacement engine 218, and the client application 249, that comprises software or code can be embodied in any non-transitory computer-readable medium for use by or in connection with an instruction execution system such as, for example, a processor 906 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the electronic commerce application 215, item replacement engine 218, and the client application 249, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 903, or in multiple computing devices 903 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:
   receive a request to view a list of previously purchased items;
   determine that a particular previously purchased item in the list of previously purchased items has been discontinued;
   select a replacement item for the particular previously purchased item;
   associate a purchase history of the particular previously purchased item with a purchase history of the replacement item;
      determine an order of placement of the replacement item in the list of previously purchased items based at least in part on the purchase history associated with the replacement item;
      generate a user interface including the list of previously purchased items and the replacement item arranged according to the order of placement, the user interface further comprising a user interface object associated with the replacement item, and user interaction with the user interface object causing a modification of a user interface view of the user interface to include an indication that the replacement item has replaced the particular previously purchased item; and
      transmit the user interface to a client device.

2. The non-transitory computer-readable medium of claim 1, wherein selecting the replacement item further comprises:
   identifying a plurality of similarly related items to the particular previously purchased item in an item catalog; and
   selecting the replacement item from the plurality of similarly related items based at least in part on a plurality of item attributes.

3. The non-transitory computer-readable medium of claim 1, wherein the user interface further provides a notification associated with a display of the replacement item that indicates a change associated with the replacement item.

4. The non-transitory computer-readable medium of claim 3, wherein the user interface object is configured to, upon user interaction, modify the user interface view of the user interface to display additional information about the replacement item.

5. A method, comprising:
   identifying, via at least one computing device, a plurality of previously purchased items associated with a user account;
   selecting, via the at least one computing device, a replacement item for an unavailable item in the plurality of previously purchased items;
   associating, via the at least one computing device, a purchase history of the unavailable item with a purchase history of the replacement item;
   determining, via the at least one computing device, an order of placement of the replacement item in a list of the plurality of previously purchased items based at least in part on the purchase history associated with the replacement item;
   generating, via the at least one computing device, a user interface comprising the list of the plurality of previously purchased items and the replacement item arranged according the determined order of placement, the replacement item being arranged in place of the unavailable item, the user interface further comprising a user interface object associated with the replacement item; and
   causing, via the at least one computing device and in response to a user interaction with the user interface object, a modification of a user interface view of the user interface to include an indication that the replacement item has replaced the unavailable item.

6. The method of claim 5, wherein the user interface object is defined by a predefined area of the user interface, and the user interaction comprises a hovering action within the predefined area.

7. The method of claim 5, further comprising determining that the unavailable item is discontinued.

8. The method of claim 5, further comprising identifying a plurality of similarly related items to the unavailable item based at least in part on an item catalog taxonomy.

9. The method of claim 8, wherein selecting the replacement item further comprises selecting the replacement item from the plurality of similarly related items based at least in part on a plurality of item attributes.

10. The method of claim 5, wherein the modification of the user interface view includes displaying a user interface overlay over the replacement item, the user interface overlay including the indication that the replacement item has replaced the unavailable item.

11. A system, comprising:
    at least one computing device; and
    at least one application executable in the at least one computing device, wherein when executed the at least one application causes the at least one computing device to at least:
    generate a list of previously purchased items;
    determine that a previously purchased item is unavailable;
    identify a replacement item for the previously purchased item;
    associate a purchase history of the previously purchased item with a purchase history of the replacement item;
    determine an order of placement of the replacement item in the list of previously purchased items based at least in part on the purchase history of the previously purchased item; and
    generate a user interface including the list of previously purchased items and the replacement item arranged according to the order of placement, the user interface further comprising a user interface component associated with the replacement item, and a user interaction with the user interface component triggers a modification of the user interface to indicate that the replacement item replaced the previously purchased item.

12. The system of claim 11, wherein the list of previously purchased items in the user interface is arranged according to at least one of: a frequency of purchase, a cadence of purchase, a recency of purchase, or a recommendation.

13. The system of claim 11, wherein the user interface includes a notification that the replacement item is an updated item.

14. The system of claim 13, wherein the notification includes a badge element.

15. The system of claim 11, wherein the modification of the user interface component includes displaying a user interface overlay over the replacement item, the user interface overlay including an indication that the replacement item replaced the previously purchased item.

16. The system of claim 11, wherein the modification of the user interface component includes displaying a card component relative to a display of the replacement item, the card component including an indication that the replacement item replaced the previously purchased item that is unavailable.

17. The system of claim 11, wherein the user interaction with the user interface component comprises a hovering action over the user interface component.

18. The system of claim 11, wherein the user interaction with the user interface component comprises a selection of the user interface component.

19. The system of claim 11, wherein the replacement item is identified by at least one of one or more item attributes, an item title, interaction history data, or preference data.

20. The system of claim 19, wherein the interaction history data includes at least one of a purchase frequency, a purchase cadence, a perchance recency, a browsing history, a viewing history, a rating history, or a prior interaction, the interaction history data being used to determine if a user has had a negative or a positive interaction with any given item.

* * * * *